Fig. 1

Patented July 6, 1954

2,682,942

UNITED STATES PATENT OFFICE 2,682,942

CLUTCH MECHANISM

Nils A. Thunstrom and Fred N. Ruic, Chicago, Ill., assignors to The Greyhound Corporation, Chicago, Ill., a corporation of Delaware Application July 23, 1947, Serial No. 763,064

17 Claims. (Cl. 192—48)

This invention relates generally to improvements in clutches and is particularly concerned with a type of centrifugal clutch which is structurally adapted for various uses. The new principles of this invention have been applied to a clutch, which transmits power only after driving speed has risen to some predetermined speed. In this sense the clutch is of the delayed-action type. Although the specific structure is claimed, yet the principle of application of centrifugally generated force or power to certain link-controlled wedges, is believed to be applicable to other clutch structures.

Among the objects of the invention are: To provide a relatively simple structure; to provide a structure the parts of which can be easily assembled; to provide a unit structure which can be easily and simply connected to the driving and driven elements; to provide a structure which can be attached to the flywheel of an engine; to provide a centrifugally operable structure in combination with an overrunning clutch, in which friction torque can be transmitted through the overrunning clutch to a shaft or driven element; to provide a clutch structure in which power transfer through an overrunning clutch is predicated on torque-transmitting engagement of the centrifugal clutch and on a clutch speed greater than driven shaft speed; to provide a clutch in which clutching is dependent on pivoted counterweights which swing in a radial direction and which act upon power toggles that in turn control power applying wedges; to provide a clutch in which springs are uniquely preloaded in balanced condition respectively for transmitting power and for regulating the application of power as controlled by links operated by counterweights; and to provide a centrifugal clutch in which face pressure will not be increased, due to increasing driving speed, after such pressure has reached a predetermined maximum.

Another object is to provide a clutch that is fully automatic in its action, and which will definitely stay in release position up to a predetermined speed, and then upon acceleration will reach its required torque transmission capacity with a relatively small increase of speed. Another object is to provide a clutch fully automatic in its action and capable of complete release at substantially the same speed as the speed at which it engages.

The present invention and structure has found valuable application in the automotive field wherein it has been applied to an auxiliary engine which is adapted to assist a main engine in the driving of a vehicle. In this application, the use of an overrunning clutch as controlled by a centrifugal clutch responsive to auxiliary engine speed, provides a device wherein no drive of the auxiliary engine by the main engine can ever occur, but in which power can be transmitted from the auxiliary engine for driving the vehicle or for assisting the main engine in driving the vehicle, as soon as the speed of the outer race of the overrunning clutch exceeds the speed of the inner race. The inner race is attached to a shaft which functions in driving the vehicle, and which shaft can also be independently driven by the main engine or by the vehicle. The overrunning clutch also provides for free wheeling under certain conditions.

The present invention can be used as a centrifugal clutch mechanism independently of an overrunning clutch, or it can be used with an overrunning clutch.

The present structure is also adapted for use in automotove vehicles where the transmission torque is to be interrupted or opened by means other than the clutch, for the purpose of shifting gears. The centrifugal clutch remains disengaged at normal engine idling speed and becomes engaged upon acceleration of the engine to some predetermined speed above idling speed.

The device has a torque capacity obtained from centrifugal force and such force is insufficient for transmitting maximum engine torque at speeds below some predetermined minimum. It is to be noted that this centrifugal clutch is not disengageable by controllable means other than its centrifugal controlling means but remains continuously engaged if the engine is operating above the R. P. M. selected for centrifugal clutching action of the clutch.

Other objects of the invention are to provide a power transmitting mechanism which evenly applies pressure to force clutch elements into torque-transmitting engagements; to provide a structure in which force or power for obtaining clutch face pressure is derived from pivoted counterweights acting through toggle linkages so arranged as to have unusual leverage advantage; to obtain such advantages with a small amount of link movement; to apply the power, generated by the weights and linkages through a plurality of precompressed springs which can be further compressed as the force increases due to rising centrifugal action of the weights; to provide in addition to the above mentioned springs other preloaded springs against which the flyweights act and to provide in addition preloaded bumper springs adapted to effect a change in spring rate of said last mentioned springs to counteract rapid increase in wedge actuating force as certain toggles approach a maximum force or power applying position and to thereby reduce to a minimum the force of impact of the weights with certain stops which limit the wedge operating links at their positions of greatest power advantage; to provide a clutch in which wear of the clutch facing material, up to a predetermined amount does not materially affect the speed at which the desired torque capacity is obtained, since toggle advantage increases as wear increases and consequently a more rapid pressure build-up occurs; and to provide an automatic adjustment feature for clutch wear takeup in which wear takeup does not affect the minimum amount of facing pressure obtainable to give adequate torque capacity.

Objects, features and advantages of the invention will appear in the description of the drawings and in said drawings.

Now referring to the drawings the numeral 1 generally indicates an engine of any preferred type having a crank shaft 2 suitably stepped in bearings, not shown. Numeral 3 indicates suitable flywheel housing attached to which by suitable bolts 4 is a casing 5. The casings 3 and 5 enclose the clutch mechanism of this invention, and the crankshaft and the casing 5 provide bearings for a shaft 10, to which power is to be transmitted by the clutch. This shaft is stepped at its inner end in a double ball-bearing 11 arranged in a bore 12 in the outer end of crankshaft 2. The opposite or outer end of the shaft 10 is held in a double roller-bearing generally indicated at 13. The shaft 10 is shown as connected to a gear 14 suitably secured to the shaft by bolts 15. This shaft constitutes an element to be driven. The shaft 10 is shown as hollow, and a second shaft 16 passes through the shaft 10 and is fixed at one end as at 17 by a key to the crank shaft, and is held at the opposite end in a ball-bearing 18 in the gear 14. This shaft 16 may drive any suitable mechanism independently of the shaft 10.

Overrunning clutch

Figures 4, 5, 6, 7:
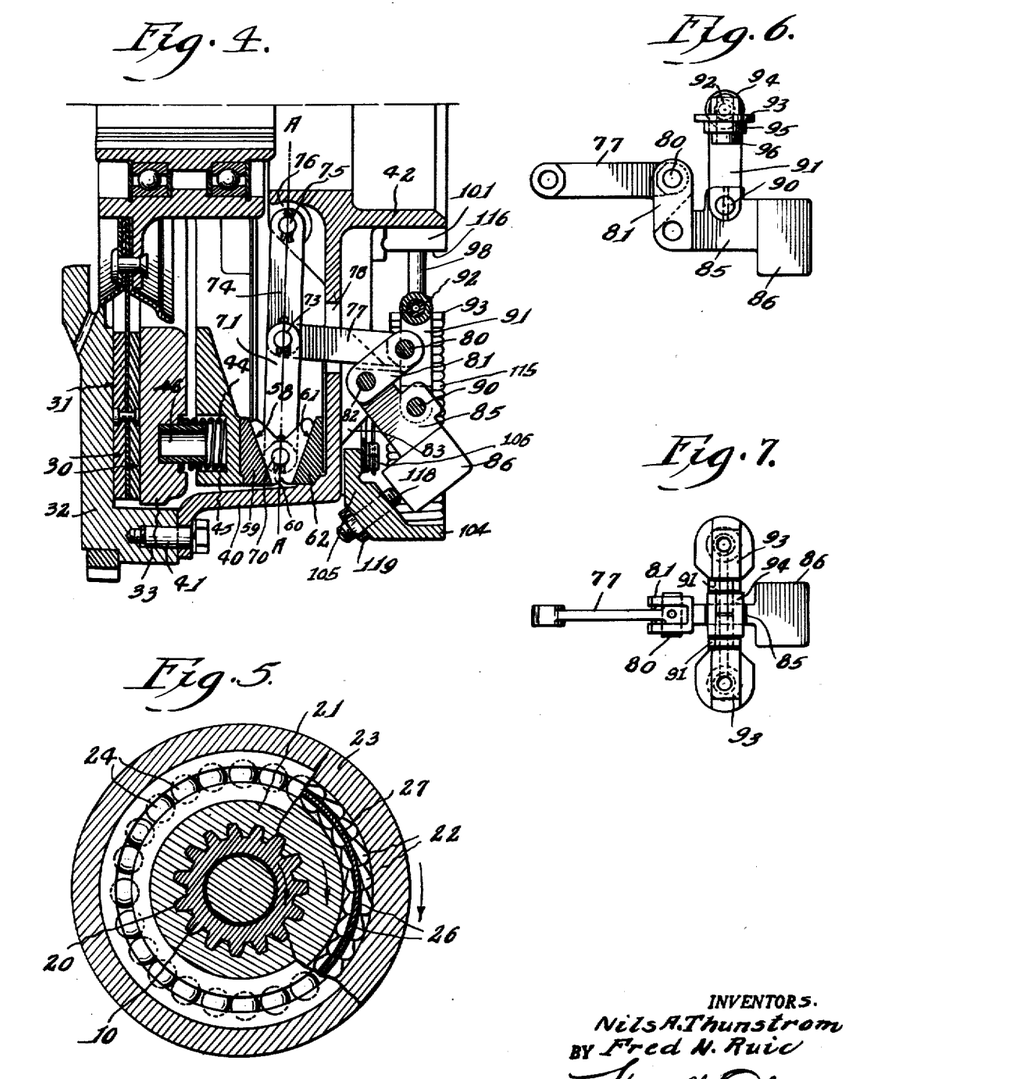
Fig. 4 is a detail of the bottom part of Fig. 1, as during clutch-in action.
Fig. 5 is a detail section of the overrunning clutch component, taken approximately on line 5—5 of Fig 1.
Fig. 6 is a detail side elevation of one of the weights, with some of the linkage elements attached thereto.
Fig. 7 is a top plan view of the structure of Fig. 6.

Splined to the shaft 10 (see Figs. 1 and 5), as at 20 is a tubular inner race 21 of an overrunning clutch. A series of clutch blocks 22 are adapted to rock and obtain wedging clutch-in action against the outer surface of the inner race and the inner surface of an outer tubular race 23. The outer race is mounted on a double row of ball-bearings 24, carried by the inner race. Fig. 5 shows the clutch blocks in released position. When the rotative speed of the outer race 23 becomes greater than that of the inner race, the blocks are rocked in clockwise direction and clutch-in action occurs and the shaft 10 is driven in clockwise direction as viewed from the left of Fig. 1.

Each rock block 22 has lateral grooves 26 one in each opposite side, and two circular constrictive springs 27 lie in the grooves one spring at each side of the circular series of blocks. This overrunning clutch is per se not claimed herein, but is claimed only in its particular structural relation to the centrifugal clutch component. Any suitable type of overrunning clutch can be used. The centrifugal clutch structure per se is important, and has uses apart from its use with an overrunning clutch.

Figure 1:
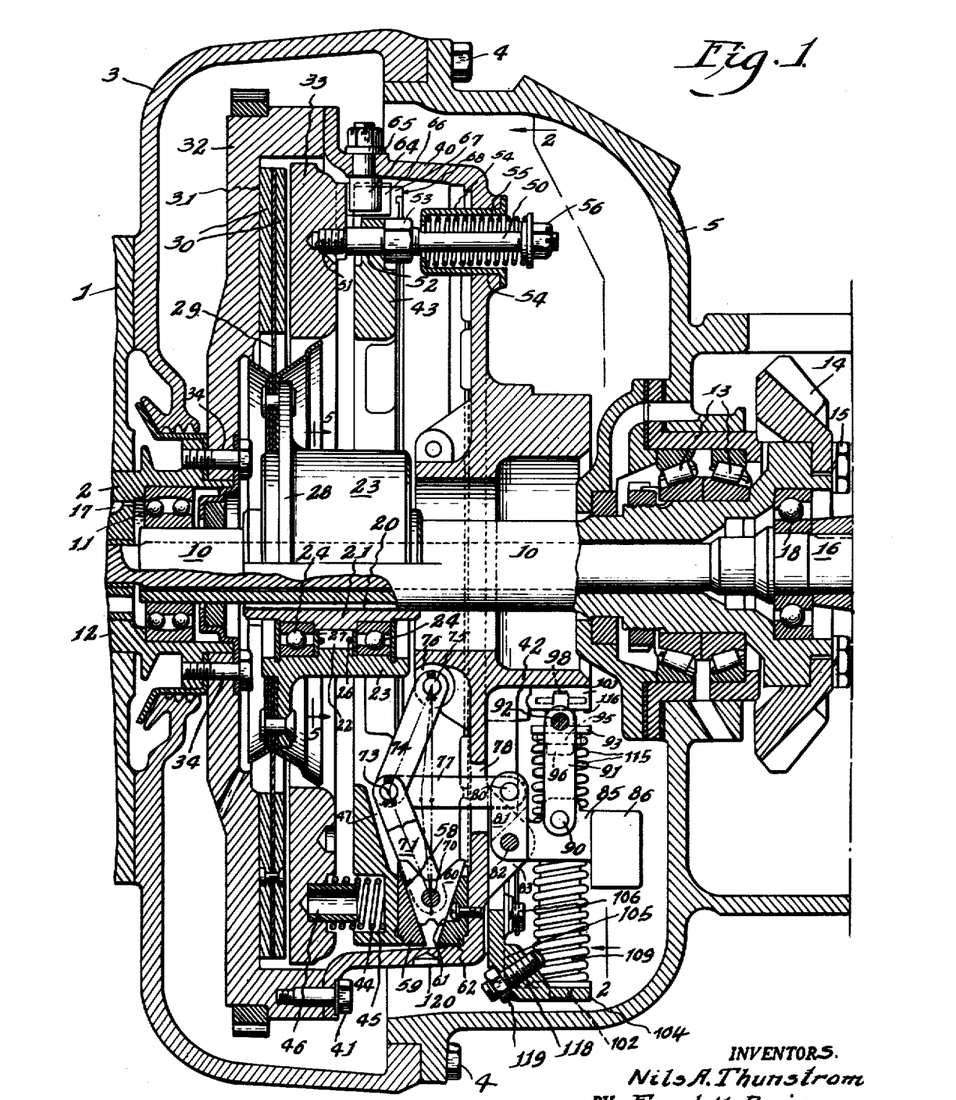
Figure 1 is a vertical section, with the clutch in release position, and showing the clutch device herein, as driven from the crank shaft of an engine, and as driving a shaft one end of which is rotatably stepped in a bearing in the crank shaft.

The outer tubular element or race 23 of the overrunning clutch has integral therewith a peripheral disk or flange 28 to which is suitably attached, as by rivets, a clutch plate 29. This plate carries at opposite sides suitable friction clutch facings, as rings 30. These clutch facing rings 30, are adapted to engage respectively a clutch surface 31 of flywheel 32, and a ring-like driving clutch element 33, sometimes referred to herein as a pressure plate, which plate is supported and operated in a manner to be described. This plate is also one of the clutch elements, which are adapted to be pressed together. The flywheel 32 is suitably secured by bolts 34 to a flange of the crankshaft 2, as shown. It is to be noted that the overrunning clutch with its clutch disk 29 is a unit separately assembled on shaft 10. The entire overrunning clutch unit with its friction disk is free to move axially in either direction.

Centrifugal clutch structure

Figure 3:
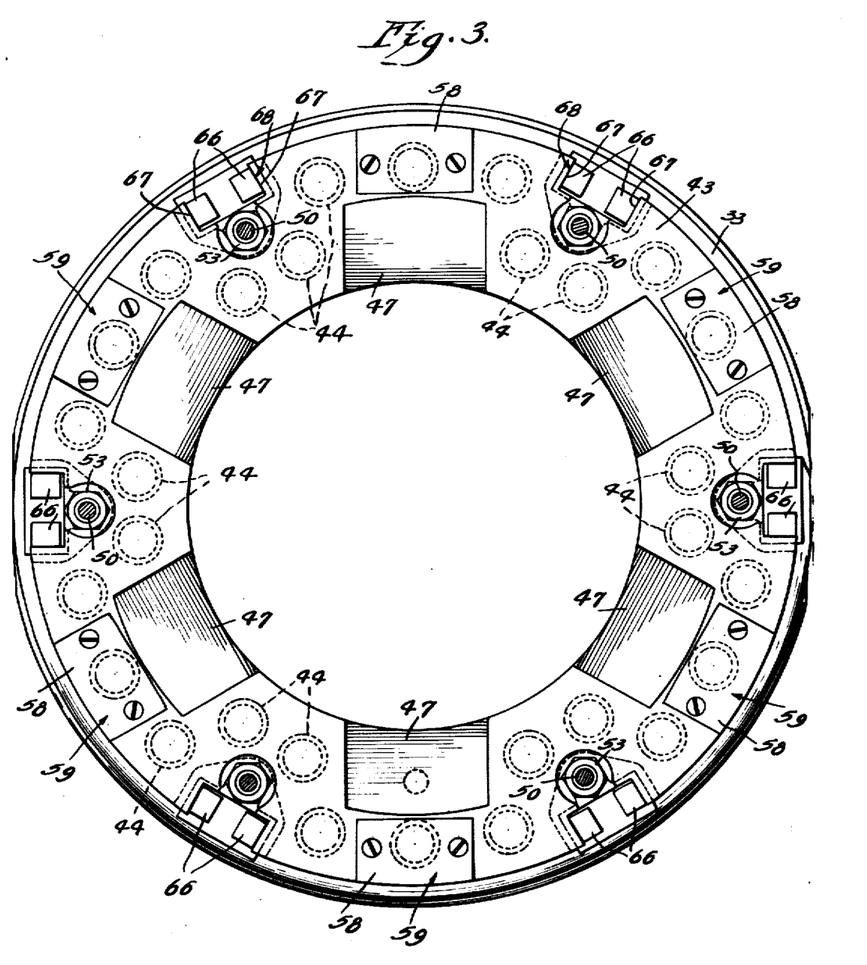
Fig. 3 is a detail face view of the driving clutch plate assembly, with the guide bolts in section.

The centrifugal clutch, as a unit, includes a casing or cover 40 upon which all of the constituent parts are mounted or supported, the casing being secured to the engine flywheel 32 by suitable bolts 41. Casing 40 has an annular hub 42 through which the shaft 10 freely passes. Partly within the flywheel 32 and partly within casing 40, are disposed two rings one of which has been referred to by the numeral 33 which may be called a clutch ring or friction element, and the other a pressure ring or plate 43 adapted to be moved by wedging action toward the clutch element 33, to apply thereto a proper clutch pressure through a circular series of compression springs 44. The elements 33 and 43 may be called the pressure-plate assembly. The plate 43 is part of the means for pressing the clutch elements together. The arrangement or distribution of these springs is best shown in Fig. 3, in which figure they are shown only in dotted lines. The springs are symmetrically arranged in balanced relation. These axially disposed springs are sometimes referred to as first springs or springs through which pressure is applied.

Sockets 45 in the ring 43 receive the springs 44 and said springs are centered around tubular projections 46 of plate 33 as shown. The plate or ring 43 is provided with six recesses 47 (see Figures 1 and 3) into which parts of toggle systems described below, project when the clutch is open. This makes for compactness. The clutch power applying rings 33 and 43 are mounted on the cover 40 for axial movement relatively to and for rotation with the cover 40. The elements 33, 40 and 43, may therefore be considered as parts of the driving member of the clutch, and the plate 29 may be considered the driven member. It will be understood that for some uses the plate 29 may be directly splined to the shaft 10, instead of being connected to the outer race of an overrunning clutch. This statement is made because the centrifugal clutch structure is believed to be new per se, and usable independently of the overrunning clutch.

Means is provided for automatically retracting the pressure plate assembly 33 and 43, as a unit. Means (see Fig. 1) is also provided for adjusting the loading of the springs 44. The means for simultaneously retracting the elements 33 and 43 include six bolts or studs 50, each having threaded engagement as at 51 with the clutch element or ring 33. Each bolt is pinned against unscrewing. The power plate or ring 43 is slidable on these bolts, the said ring having suitable bores 52 for this purpose. On each bolt is an adjustable stop nut 53 engaged with suitable threads of the bolt. By adjusting these nuts the initial loading of springs 44 can be correspondingly adjusted. Each bolt 50 extends outwardly through an opening in an end wall of a thimble 54. Each thimble is mounted in an opening of the cover 40. A spring 55 is housed in each thimble and surrounds the bolt 50, and is under compression against the inner end of the thimble and a spring loading adjusting nut 56 threaded on the rod 50. The six springs 55 act to retract the pressure-plate assembly, that is, move them to release position. These springs are sometimes referred to as second springs. These springs also force wedging surfaces 58 of wedge plates 59 toward wedges 60, and toward companion wedging surfaces 61 of the wedge plates 62 carried by the inner face of the cover 40, as will be more fully described herebelow.

Rings 33 and 43 are centered and positively connected to rotate with the cover 40 by means of six studs 64 attached to bolts 65 which bolts pass through the wall of cover 40 and are held by suitable nuts as shown. Studs 64 have a cuboid form and project radially from the inner surface of the cover 40. Each stud 64 is disposed between and has opposite flat faces slidably engaged with opposed flat surfaces of a pair of axially extending lugs 66 of the ring 33. The outer face of each lug 66 of a pair is similarly slidably engaged with the opposed surfaces 67 of a corresponding radial notch 68 of the ring 43. The relation of the lugs 66 to the surfaces of the recess 67 are also clearly shown in Fig. 3. Thus the rings are centered yet are free to move axially, but must rotate with the casing or cover 40 and therefore with the flywheel.

Centrifugal mechanism

A centrifugally operable mechanism automatically acts to force the ring 43 toward the ring 33 to cause the ring 33 to clutch-in by engaging one clutch facing 30 to press the other facing 30 against flywheel surface 31. This mechanism is believed to be a unique and unusually efficient and sensitive power-applying mechanism. The springs 44 are initially under compression for a purpose to be explained.

Referring first to Figures 1 and 3. There are six wedge plates 59 each providing a wedging surface 58, and these plates are removably secured as by screws to the face of the ring 43. Six corresponding and opposed, wedge plates 62 provide wedging surfaces 61 and these plates are detachably secured by screws to the inner face of the cover 40. There are also six wedges 60 one for each pair of wedge plates and each wedge is controlled in this instance by a weight-actuated toggle mechanism. Great wedging power is obtained by relatively small motions of two links, from disaligned to aligned position.

For this clutching force control, each wedge 60 (see left hand side of Fig. 2) has pivoted thereto at opposite sides as by a pin 70, two links 71. These links are in turn pivoted by a pin 73 to three links two of which are indicated at 74. The links 74 are in turn pivoted by a pin 75 to a radial projection 76 of the hub 42 of the casing or cover 40. The pin 73 forms a pivot for one end of a third link 77. The end of link 77 lies between the links 74. Link 77 passes freely through an opening 78, see Fig. 1, in the cover 40. The link 77 is pivoted by a pin 80 see also Figure 2 between fork elements of a short arm, 81 of a bell crank lever pivoted by a pin 82 between a pair of lugs 83 projecting from the outer face of the casing 40. The long arm 85 of the bell crank lever includes a weight 86 at its outer end.

Each long arm has connections by which it acts, when the weights are centrifugally moved, to additionally compress four pre-compressed springs. The weights begin to act on the toggles to move the wedges to obtain clutch-in action when engine speed exceeds some speed which is below the maximum engine speed, and which may be substantially below said maximum speed.

Figure 2:
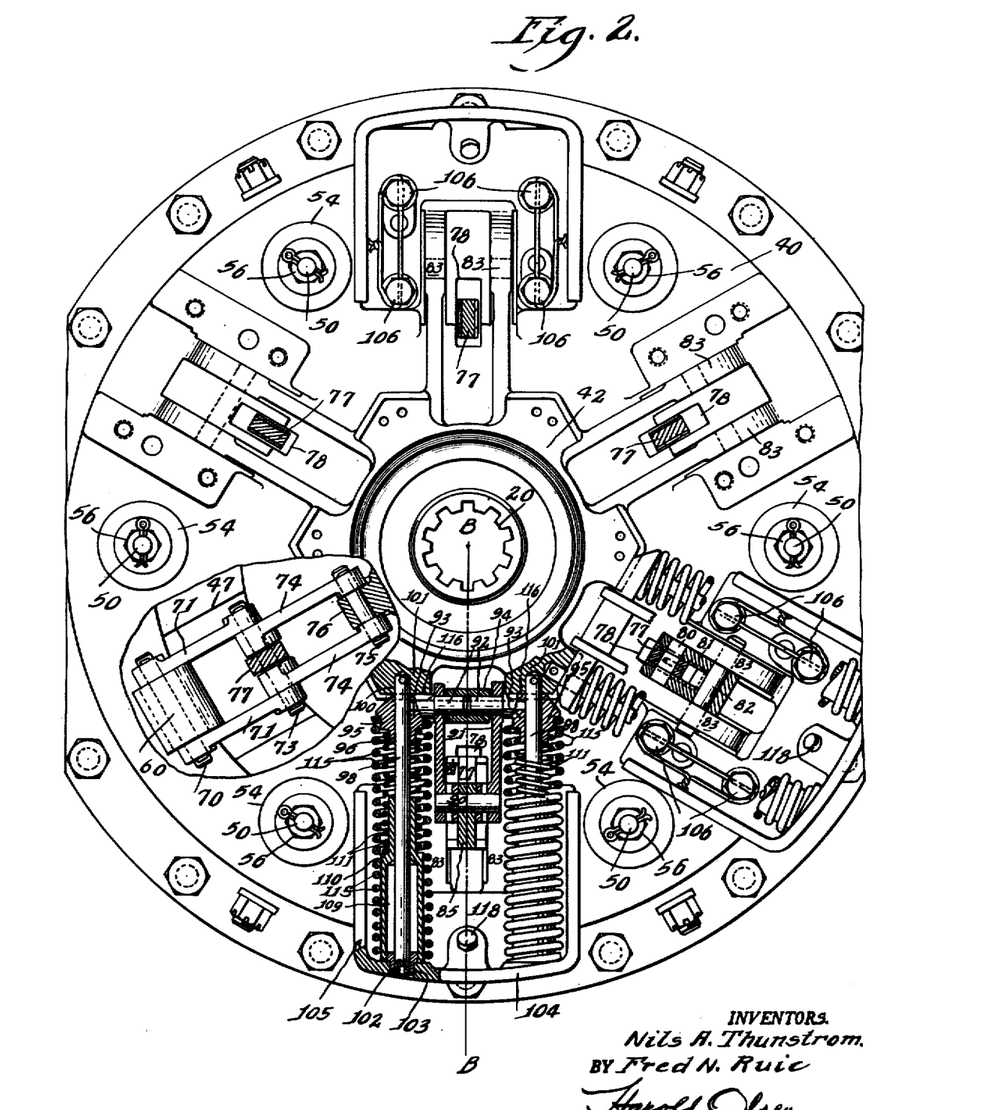
Fig. 2 is a view of the clutch, viewed generally from the position line 2—2 of Fig. 1, but in which to facilitate illustration parts are broken away or omitted and sections are taken on different planes.

Now referring to the lower part of Figure 2. Pivotally connected by a pivot pin 90 to the long arm 85 of the bell crank lever are two links 91. These links as well as other elements of the centrifugal mechanism are symmetrically disposed at opposite sides of a radial line B—B, extending from the axis of rotation of the clutch. The pin 90 is secured as by small tapered pins. The upper end of each link 91 is pivoted to a pin 92 projecting laterally and inwardly from a slide head 93. These pins project into a link-spacing sleeve 94. Each slide head has two spring centering projections respectively 95 and 96, and each projection has associated therewith a shoulder for engagement by a corresponding spring. Each head is slidably guided on a rod 98 these guide rods being arranged in parallel relation one at each opposite side of and parallel with the links 91 and line B—B. Each rod is stepped and secured in an opening 100 of a radial projection 101 of the hub 42 and is held by cross-pin. At the opposite end each rod 98 is stepped in a shouldered sleeve 102 in turn stepped in an opening 103 of a shelf 104 of a bracket 105 suitably bolted as at 106 to the outer face of the casing 40. Each rod passes through and centers a tubular spring guide 109 having an upper portion of reduced diameter, and a lower tubular portion of larger diameter which is centered by engagement with a head of the element 102, as shown.

Each spring guide provides a shoulder 110 abutted by the outer end of an inner spring 111, the upper end of which spring abuts a shoulder associated with the projection 96 of the slide-head 93. The lower part of each spring 111 is guided by the reduced upper portion of the corresponding guide 109. A larger heavier spring 115 surrounds the spring 111 and surrounds and is guided by the lower portion of the spring guide 109, and at its lower end this spring 115 abuts the shelf 104. At its upper end spring 115 engages the centering element 95 of the slidehead and abuts a shoulder associated therewith.

The springs normally press each slide 93 against a shoulder 116, and with the parts so positioned the wedges are retracted as in Fig. 1, and the weights are held in the position shown. The springs are under initial compression for this purpose. These springs 115 and springs 111 are sometimes referred to as third springs against which the centrifugally operable means acts. The weights move under centrifugal action against spring load which, when the clutch is accelerated above its hold out speed, only partly offsets the centrifugal action. The weights finally assume the position of Figure 4. At the end of this movement the links 71 and 74 have assumed the longitudinally or axially aligned position of the figure, at which position wedging power action is at its maximum and the clutch is fully engaged, at its maximum torque transmitting pressure. The outward motion of each weight is limited by the engagement of the weight with an adjustable stop screw 118, which is held by a set-nut 119. Here it is to be noted that in this limit or clutch-in position the short arm 81 of the bell crank lever has entered between the links 91, the total width of the arm in relation to the spacing of the links permitting this entry.

The use of the toggle mechanism herein for moving the wedges provides a very compact structure whereby relatively very forceful wedging action may be had, since the point of initial application of centrifugally generated force to the links is only a short distance laterally of their final limit position of alignment. On the other hand the connection of one end of the toggle link with the short arm of a bell crank lever substantially increases the power advantage because the weights are arranged at the outer end of the long arm of the bell crank lever.

The springs 44 and 55 are axially arranged and the springs 111 and 115 are radially disposed. All of these springs are, on assembly, preloaded to hold the clutch in release position at an engine, or driving member, speed of 900 R. P. M., for example. The forces of these springs are therefore balanced for this purpose. The bumper springs 111 are relatively lightly preloaded and act, as the counterweights move under centrifugal action, to effect a change in the spring rate of springs 115 to counteract or compensate for the rapid increase in lever advantage as the toggle links 71 and 74 more nearly approach their aligned position of Figure 4. This arrangement is for the purpose of preventing what might be termed a banging of the weights against the stops 118, as the links reach their aligned position beyond which they must not move in the same direction and at which they have performed their maximum useful action.

The assembly is dynamically balanced by careful positioning of the parts radially and circumferentially with respect to the rotative axis of the clutch. Any unbalance due to slight differences in the weights of like parts, can be largely overcome after assembly by drilling a number of pockets 120 in the periphery of the cover 40 as shown. The number and spacing and depth of these drilled pockets will vary according to requirements. However, by carefully matching in relation to weight, groups of parts before assembly, the amount of stock required to be removed can be kept at a minimum.

Of course, the parts for each wedge operating unit are substantially the same for all units so that corresponding parts are interchangeable.

Operation

In order to facilitate explanation of the action of our clutch, we will use some numerical references, which, however it will be understood are only for purposes of illustration, and with no intention to limit the invention thereby. The principles of the invention can be applied for a great variety of speed and torque capacities conformably to the requirements of engines of different specifications and characteristics. For example, the clutch may be considered to always remain open at 900 R. P. M. The wedges may start to move radially, at 920 R. P. M. Clearance between the clutch surfaces may be taken up at about 950 R. P. M. when the facings are new, and at about 1070 R. P. M. when the facings are worn, for example, a total of one-eighth of an inch. Facing pressure to transmit adequate transmission torque of about 325 foot pounds may be had at 1140 R. P. M., when the facings are new, and at about 1160 R. P. M. when the facings are worn in the amount above mentioned. Five hundred foot pounds of torque may be transmitted at a facing pressure of 1900 pounds, which pressure may be had at 1240 R. P. M. when the facings are new, and at 1210 R. P. M. when the facings are worn. Maximum facing pressure of 2865 pounds may be had at about 1400 R. P. M. when the facings are new, and 2220 pounds pressure at 1350 R. P. M. when the facings are worn in the total amount above mentioned. In this example the pressure cannot become greater than 2865 pounds, even though the engine or clutch operates at higher speeds after that pressure has been reached. This maximum clutch facing pressure will remain constant for higher engine R. P. M.'s because the toggle links 71 and 74 will at this time have assumed the aligned position of the line A—A of Figure 4, beyond which they cannot move in the same direction because of the engagement of the weights 86 with their stops 118.

The load of axial springs 44 may be adjusted, for example, to preload them to initially exert 1900 pounds pressure between the plates. When the weights begin to act centrifugally, the first part of their movement results in the taking up of clearance.

The wedging force first acts to overcome the precompression load of the pressure-plate retracting springs 55, and so acts until facing clearance is taken up. From the moment that clearance is taken up wedging force acts to increase facing pressure so that adequate torque (325 ft. lbs.) is obtained before wedge presure becomes sufficient to begin to compress the preloaded springs 44. Then as wedging force becomes greater the springs 44 are additionally compressed and facing pressure increases beyond the preloaded pressure (1900 pounds), of the springs 44. When the wedges have reached their outward limit of movement (links aligned), facing pressure has also risen to its maximum limit, of 2865 pounds, with new facings, or of 2220 pounds, with facings worn to the maximum. In the example, the pressure of 2865 pounds is obtained at 1400 R. P. M. and the pressure of 2200 is obtained at 1350 R. P. M. The action of the springs 44 and of the links (as limiting wedging force), thus prevents the building up of excessive facing pressures, and limits the reaction force on the clutch-mounting cover or casing 40 to a predictable maximum upon which calculations can be based for providing needed strength for this casing or cover.

It will be noted that the pre-loaded pressure-plate springs 44 provide for automatic adjustment for clutch facing wear, up to a predetermined maximum, since wear up to that amount only affects the amount of clearance to be taken up and does not affect the minimum but adequate facing pressure obtainable. Moreover, the amount of facing clearance, within a given wear range, does not materially change the speed at which the desired torque capacity can be obtained, since after taking up a greater clearance the toggle advantage is materially increased and consequently a more rapid pressure build-up occurs.

This condition also accounts for the fact that maximum obtainable facing pressure is reached at a somewhat lower R. P. M. with worn than with new facings.

During the first part of the movement of the weights and until clearance is taken up, the weights are acting against the spring pressures of springs 55, 111, and 115, then as soon as the clearance has been taken up the pressure rises with speed increase but without wedge movement, up to the preload of the springs 44, that is in the example up to 1900 lbs. Then the weights cause the wedges to move out and apply additional pressure to the springs 44. However, by this time the force advantage of the links has increased because they have more nearly approached their aligned position of Fig. 4, so that less centrifugal force is required to move the wedges outwardly. Also the radial springs 115 have become less efficient, because of their own centrifugal action. The buffer springs 111 then act in a manner to slow down the outward movement of the actuating weights so that the weights do not engage the stops 118 violently.

The release cycle is substantially the same as the engaging cycle, so that upon reducing the clutch speed down to the predetermined hold-out speed (of 900 R. P. M. in the above example) a full release condition has been obtained. Since the frictional resistances of the linkages are small and the wedges are not self-locking, the energy stored in the springs 44, 55, 115, and 111 at their reduced heights, corresponding to a clutch engaged position, is ample to gradually restore the moving parts to their clutch-disengaged position, as the speed is gradually decreased. A factor contributing to the responsiveness of release is the fact that a large portion of the stored energy of the radial springs 111 and 115 is not due to the centrifugal action of the moving weights, but is due to the centrifugal action of the springs themselves. The effectiveness of the springs as counteracting the centrifugal action of the moving parts is therefore greater at speed reduction than at speed increase, compensating for friction resistances which tend to cause a release lag.

We have herein illustrated an automatic clutch of the dry single plate type, although the invention may be applied to other types of clutches. In this invention clutch disk pressure is obtained by centrifugal action of flyweights upon toggle operated wedges. Friction torque is transmitted from the driven member to the clutch shaft by means of an overrunning clutch only when the speed of the driven member is the same as shaft speed. The power transferred through the overrunning clutch is predicated on an engagement of the centrifugal clutch and on a clutch speed greater than driven shaft speed. The power clutch is designed to remain disengaged at an engine speed which is substantially below the top speed of the engine.

From the moment that facing clearance is taken up acceleration of the engine results in the building up of clutch face pressure due to wedging action. The main engaging force for the clutch is derived from pivoted counterweights which swing radially outwardly and act on the toggle linkages to move the wedges radially outwardly. Additional force is derived from the centrifugal action of the wedges and part of the toggle. Acting to hold the clutch in release position, for example, at 900 R. P. M., are mainly the substantially radial springs 111, 115, bracket-mounted in pairs, and connected to a corresponding counterweight. Also acting for the same purpose are the axial springs 55 mounted on the clutch cover so as to force the pressure plate assembly toward the cover and away from facing contact. The springs 111, 115, are preloaded at their respective installed heights to balance the operating forces in clutch-released position at 900 R. P. M. The bumper springs 111, mounted inside the radial springs 115 and acting between the counterweights and the radial spring-mounting brackets are installed at a small amount of preload. The relation of preloading of the springs 111 and 115, to the initial and final position of the links 71 is belived to be unique. The arrangement is such that the force applying action of the links increases in an increasing ratio as the links move in power applying direction from an initial inactive position of Figure 1, to the maximum power applying position of Figure 4.

The springs are preloaded in relation to their increasing ratio, so that an increased spring rate is obtained upon the balanced disengagement position of the moving parts. This increased spring rate also compensates for loss of spring efficiency due to centrifugal action on the springs themselves and aids materially in obtaining the desired release cycle. It is noted that the outer springs 115 are longer and heavier than the inner springs 111.

A pressure-plate assembly may be said to comprise plates 33 and 43 and springs 44. An example of the amount of separating force exerted by the springs between the two plates of the assembly has been heretofore mentioned. This spring reaction is taken up against the nuts 53 of bolts or studs 50, and these nuts also provide means for adjusting spring pressure.

After the engine has been accelerated until the facing clearance is taken up, the wedges begin to exert pressure against pressure plate assembly springs and from the moment clearance is taken up and until the wedge pressure equals the preload pressure of the pressure springs 44 no wedge movement takes place. Then as wedge pressure increases beyond the preload pressure of the springs 44 these springs are compressed as the wedges continue to move radially outwardly to their limit positions. The action of the pressure plate springs thus prevents excessive facing pressure from being built up. The plate springs 44, also furnish an automatic adjustment feature for taking up a predetermined amount of clutch facing wear. This wear only affects the amount of clearance to be taken up and does not affect the minimum facing pressure obtainable. Moreover, the amount of facing clearance does not materially change the speed at which the desired torque capacity is obtained, since after taking up a greater clearance the toggle advantage is materially increased and a more rapid pressure build-up occurs.

It is noted that the axes of all pivots associated with the centrifugally operable mechanism extend in a direction perpendicular to the axis of rotation of the clutch. On the other hand the springs 44 and 55 extend in a direction parallel to the axes of rotation. It is again to be noted that the plate 29 may be connected directly to the shaft 10 instead of to the outer race of an overrunning clutch.

What we claim is:

1. A device of the class described comprising, a shaft to be driven, friction clutch elements, one adapted to drive said shaft, said elements being adapted to assume clutch relation when pressure is applied, means for driving one of the elements and having thereon plural pressure-generating means for pressing said elements together, each means comprising a pair of radially disposed toggle links and a wedge radially moved thereby, a lever weighted to be moved by centrifugal action, and means connecting the lever to operate the toggle links, and precompressed springs having different spring rates and connected with each lever to be compressed by centrifugal action of the corresponding weighted lever.

2. A device of the class described comprising, a driving member, a driven member, clutch elements adapted to be pressed together to cause the driving member to drive the driven member, centrifugally operable means adapted to begin to supply pressure to said elements for clutch driving action when driving speed reaches a predetermined speed and to thereafter increase said pressing to a predetermined maximum as driving speed increases, and means which prevents increased pressure action of said last-mentioned means after the pressure is at a maximum even though driving member speed increases after said maximum pressure has been attained, said means including toggle-power operated wedges in which the toggles assume an aligned position to obtain said maximum pressure.

3. A device of the class described comprising, a driving member having a clutch surface, a driven member having a clutch element movable to engage said clutch surface, said driving member having a clutch member movable to engage said clutch element and press it against said clutch surface, a plurality of wedges and means through which they act to force said clutch member to clutch-in position, centrifugally movable weights pivoted to said driving member one for each wedge and means connecting said weight with the corresponding wedge to cause it to be advanced for clutch-in action when said weights are moved centrifugally and to withdraw the wedges for clutch release when centrifugal action is sufficiently lessened, the said clutch member having the form of a ring and part of the means on which said wedges act being a ring, springs arranged between the rings and through which force is applied for clutch-in action, means connecting the rings so that the spring tension can be adjusted, means limiting separation of the rings under the action of the springs, and means for automatically moving said rings in unison to clutch release position as the wedges are withdrawn.

4. A device of the class described comprising, a shaft to be driven, friction clutch elements one adapted to drive the shaft, plural means simultaneously operable for causing said elements to assume clutch relation, each means comprising toggle links and a wedge operated thereby, a lever weighted to be moved by centrifugal action, means connecting the lever to operate the toggle links, springs against which the lever acts when centrifugally moved, and means connecting the springs with the lever so that under centrifugal action the springs are compressed and are thereby conditioned to act to cause operation of the lever and links to withdraw the wedge when centrifugal action on the weighted lever reaches a predetermined minimum, and thus allow the clutch to open.

5. A device of the class described comprising, a shaft to be driven, first, second, and third friction clutch elements adapted to be pressed together for driving the second element said second element being connected to rotate the shaft, means for driving the first element, plural means carried by the first element for applying pressure to the third element for driving the second element, each means comprising a pair of toggle links and a pivot connecting them, and a wedge operated by said links, a pivoted bell crank lever having long and short arms the long arm being weighted to be moved by centrifugal action, a link connecting the short arm of the lever and toggle link pivot to operate the toggle links, precompressed springs against which the lever acts when centrifugally moved, and means connecting the springs with the long arm of the lever so that under centrifugal action the springs are addiitonally compressed.

6. A device of the class described comprising, a shaft to be driven, first, second, and third friction clutch elements adapted to be pressed together for driving the second element, said second element being connected to rotate the shaft, means for driving the first element, plural means carried by the first element for applying pressure to the third element for driving the second element, each means comprising toggle links and a wedge operated thereby, a pivoted bell-crank lever weighted to be moved by centrifugal action, means connecting one arm of the lever to operate the toggle links, springs against which the lever acts when centrifugally moved, means connecting the springs with the lever including a pair of links pivoted to the lever, a pair of heads abutted by the springs, means guiding the heads, a spacer sleeve between the links, each head having a pivot pin traversing a corresponding link and entering the sleeve, the arrangement being such that under centrifugal action the links operate respective heads to additionally compress the springs.

7. A device of the class described comprising, a shaft to be driven, first, second, and third friction clutch elements adapted to be pressed together for driving the second element said second element being connected to rotate the shaft, means for driving the first element, a power plate on the first element, precompressed power transmission springs between the power plate and said third element, plural means carried by the first element for applying pressure to the power plate for driving the second element, each means comprising toggle links and a wedge operated thereby to be radially moved to close the clutch, a lever weighted to be moved by centrifugal action and a pivot for the lever, and a link connecting one arm of the lever directly with the toggle links.

8. In a device of the class described, a driving member having a clutch surface, a driven member having a clutch element adapted to engage said clutch surface, a housing attached to said driving member, a clutch ring having a clutch surface engageable with said clutch element to press it into engagement with the first mentioned surface, a power ring having wedging surfaces, springs between said rings adapted to be compressed by movement of the power ring to force the clutch ring to clutch-in position, means so connecting the rings to the housing that they must rotate therewith but each can move axially independently of the other, guide means carried by the clutch ring and traversing the power ring to guide said power ring and adapted to permit axial adjustment between the rings, means for automatically moving the rings away from clutch posiiton, wedging surfaces on the housing opposed to corresponding wedging surfaces of the power ring to provide opposed pairs of wedging surfaces, a plurality of wedges each adapted to act on a pair of opposed wedging surfaces, to force the power ring towards clutch-in position, weights on the housing one for each wedge and means mounting each weight for movement by centrifugal action, means connecting each weight with a corresponding wedge to cause wedging action during centrifugally urged motion of the weight, and spring means against which each weight acts while being moved centrifugally.

9. A device of the class described comprising, a shaft to be driven, rotatable first, second, and third friction clutch elements adapted to be pressed together for driving the second element, said second element being connected to rotate the shaft, means for driving the first element, and means carried by the first element for applying pressure to the third element to drive the second element including, weights adapted to move by centrifugal action, wedges, and toggles operable by said weights to translate the wedges to move the third element to and hold it in clutch-driving relation with the first and second elements, said toggles including a pair of links which are normally disaligned in direction of their length but which as they are brought to aligned position move the wedges to obtain the aforesaid clutching action, the said weights and the said links being movable on pivots the axes of which are perpendicular to a radius extending from the axis of rotation of the clutch elements, springs and means adapting them to act on the weights for normally holding said links in disaligned position and against the force of which the weights are adapted to move by centrifugal action.

10. A device of the class described comprising, a driving member having a clutch surface, a driven member having a clutch element moveable into clutch engagement with said clutch surface, said driving member having a clutch member movable to press the clutch element against said clutch surface, a plurality of means arranged in balanced relation about the axis of rotation of the device, each means including a translatable wedge and a pair of pivoted toggle links and a weight adapted to move under centrifugal action and means connecting each weight with corresponding links for causing the links to assume aligned relation and advance the wedges to apply clutching power as centrifugal action on weights increases, and for causing the toggles to assume disaligned relation and withdraw the wedges to obtain retraction of the clutch member as said centrifugal action decreases.

11. In a device of the class described, a driving member having a clutch surface, a driven member having a clutch element movable to engage said clutch surface, said driving member having rotatable therewith a clutch member movable to engage said clutch element and press it against said clutch surface, a plurality of wedges and means through which they act to force said clutch member to clutch-in position, centrifugally movable weights on said driving member one for each wedge, means connecting each weight with corresponding wedge to cause wedging and clutch-in action when said weights are centrifugally moved and to withdraw the wedges for clutch release action when centrifugal action ceases, a pair of springs against which each weight acts and between which the weight projects, and means connecting each weight with a corresponding wedge including toggle links and said links and springs being symmetrically related to a plane which extends in direction of and is radial with respect to the axis of rotation of the driving member.

12. A device of the class described having, driving and driven members, clutch elements adapted to be pressed together to transmit torque from the driving to the driven member including a clutch ring, a pressure ring, a casing on the driving member, springs between the rings, means connecting the rings for adjustment of the pressure of the springs, means movably mounting the rings on the casing and springs for retracting the rings, wedging surfaces on the pressure ring, wedging surfaces on the casing, wedges engaging said surfaces, centrifugally operable weighted levers pivoted on the casing one for each wedge, connections between each lever and a wedge by which force is applied to the wedge to move the pressure ring to press the clutch elements together including, toggle links connecting with the wedges, two pairs of springs one spring of each pair being within the other and the inner spring being weaker than the outer, and means by which the lever compresses the springs as their weights move by centrifugal action.

13. A device of the class described comprising, a driven member, a driving member, elements adapted to be pressed together to cause the driving member to drive the driven member including, a clutch element on the driving member, a plurality of centrifugally operable means on the driving member, wedges adapted to move radially outwardly to apply pressure to said clutch element, a pair of links for each wedge, first means pivoting the links together, means pivoting one of the links to the driving member and means pivoting the other link to a corresponding wedge, a third link pivoted to the first pivoting means, means connecting said third link to a corresponding centrifugally operable means, the said pair of links being initially disaligned and being adapted to move toward an aligned position to move the wedges radially outwardly when the said centrifugally operable means acts centrifugally.

14. A device of the class described comprising, friction clutch elements, centrifugally operable means for generating clutch pressure for said elements, each means comprising links and a wedge operated thereby and a lever having a weight adapted to be moved by centrifugal action for moving the links from non-aligned to aligned position and during which motion clutch pressure and power advantage increases to maximum limits, first springs against which the centrifugally moved weights act, said springs being themselves acted upon centrifugally in a manner to lessen their efficiency as centrifugal action increases, and additional springs adapted as the toggle links approach their aligned position of greatest power advantage to compensate for the lessened efficiency of the first springs, whereby to substantially lessen the rate of motion of the centrifugally moved weights.

15. A clutch having driving and driven members, the driving member providing a chamber having a removable cover, clutch elements within the chamber adapted to be pressed together to transmit torque from the driving to the driven member, means within the chamber by which pressure is applied to said clutch elements, including wedges which are moved radially to close the clutch, and a pair of links for each wedge which are adapted to move to a longitudinally aligned position at which the clutch is fully closed, a centrifugally movable lever for operating each pair of links and located at the outside of the chamber and mounted on said cover, means connecting said lever with a pivot which connects the links and passing through an opening in the cover, and means for preventing further movement of said links in the same direction after they have reached their aligned position.

16. A device of the class described comprising, driving and driven members, a clutch plate on the driven member adapted to be moved into clutch engagement with the driving member, clutch means adapted to be moved into engagement with the clutch plate to close the clutch, means by which said clutch means is driven by the driving member, springs for moving said clutch means away from clutching position, said clutch means having wedging surfaces opposed to wedging surfaces on the driving member, wedges acting on said surfaces to close the clutch, pivoted links for each wedge, means pivoting one of the links to the driving member, and means pivoting another link to the wedge, said links adapted to move from a non-aligned to a longitudinally aligned position at which maximum clutching pressure is applied, means centrifugally operable to move said links to said aligned position, means for preventing further motion of said links in the same direction after they have reached said aligned position, and springs adapted to increasingly resist centrifugal motion of said centrifugally operable means, the axes of said springs being so arranged that the springs themselves are submitted to centrifugal action.

17. A device of the class described comprising, driving and driven members, an overrunning clutch on and adapted to drive the driven member, a clutch plate secured to the outer race of the overrunning clutch adapted to be moved into clutch engagement with the driving member, clutch means adapted to be moved into engagement with the clutch plate to close the clutch, means by which said clutch means is driven by the driving member, springs for moving said clutch means away from clutching position, said clutch means having wedging surfaces opposed to wedging surfaces on the driving member, wedges acting on said surfaces to close the clutch, a pair of links for each wedge, a pivot securing the links together, means pivoting one of the links to the driving member, means pivoting the other link to the wedge, said links adapted to move from a non-aligned to a longitudinally aligned position at which maximum clutching pressure is applied, means connected to each pair of links and centrifugally operable to move said links to said aligned position, means for preventing further motion of said links in the same direction after they have reached said aligned position, and springs adapted to increasingly resist centrifugal motion of said centrifugally operable means as said links nearly approach their aligned position, said springs being radially arranged to be themselves submitted to centrifugal action.

References Cited in the file of this patent

UNITED STATES PATENTS

| Number | Name | Date |
|---|---|---|
| 474,429 | Walker | May 10, 1892 |
| 1,478,294 | Patterson | Dec. 18, 1923 |
| 1,554,206 | Eos et al. | Sept. 22, 1925 |
| 1,661,172 | England | Mar. 6, 1928 |
| 1,861,080 | Chorlton | May 31, 1932 |
| 2,055,178 | Lyman | Sept. 22, 1936 |
| 2,071,588 | Swennes et al. | Feb. 23, 1937 |
| 2,075,579 | Hansen | Mar. 30, 1937 |
| 2,082,129 | Van Ramst | June 1, 1937 |
| 2,090,397 | Haupt | Aug. 17, 1937 |
| 2,143,312 | Griswold | Jan. 10, 1939 |
| 2,191,846 | Carwardine | Feb. 27, 1940 |
| 2,239,568 | Newton | Apr. 22, 1941 |
| 2,275,068 | Ruesenberg et al. | Mar. 3, 1942 |
| 2,300,521 | Spase | Nov. 3, 1942 |

Dedication 2,682,942.—*Nils A. Thunstrom* and *Fred N. Ruic*, Chicago, Ill. CLUTCH MECHANISM. Patent dated July 6, 1954. Dedication filed Aug. 22, 1957, by the assignee, *The Greyhound Corporation*.
Hereby dedicates to the public the unexpired term of said patent.
 [*Official Gazette October 1, 1957.*]